Nov. 15, 1960  C. BRUNO ET AL  2,960,597
WELDING OF CIRCULAR JOINTS AND THE LIKE
Filed June 25, 1958  8 Sheets-Sheet 1
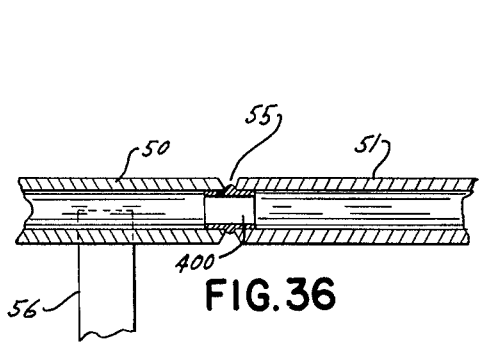
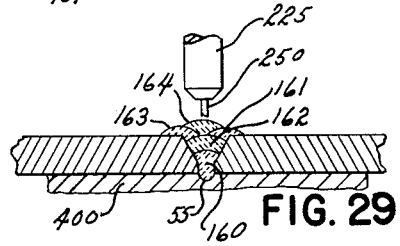
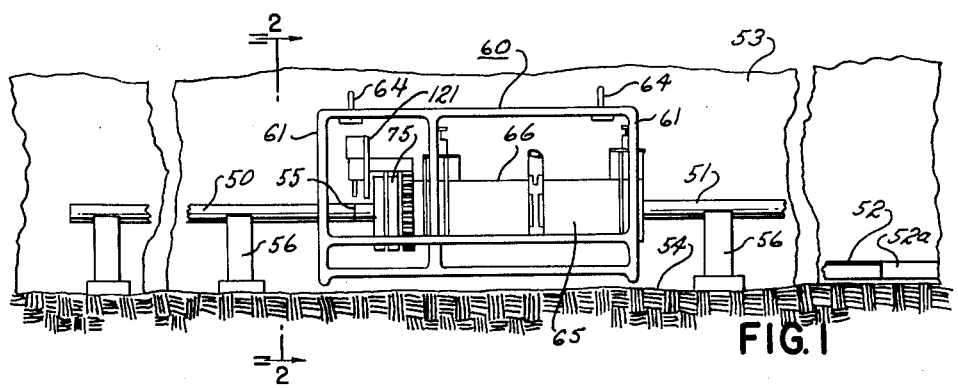
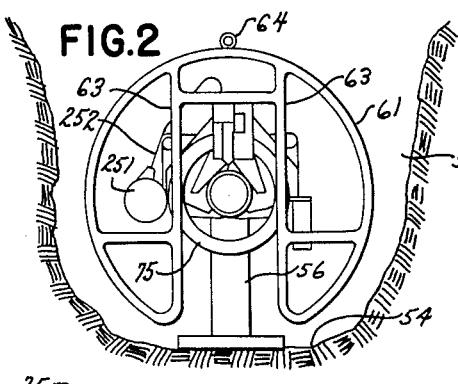
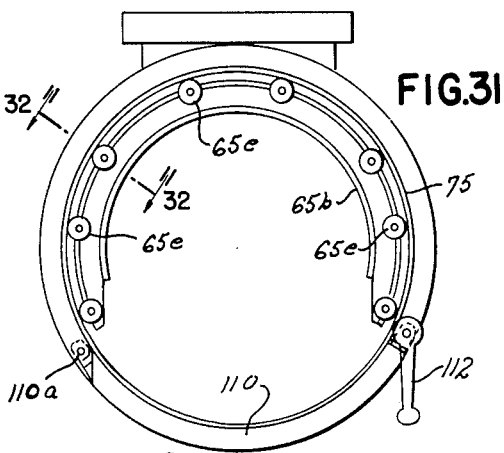
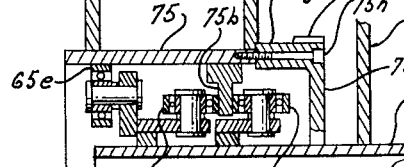
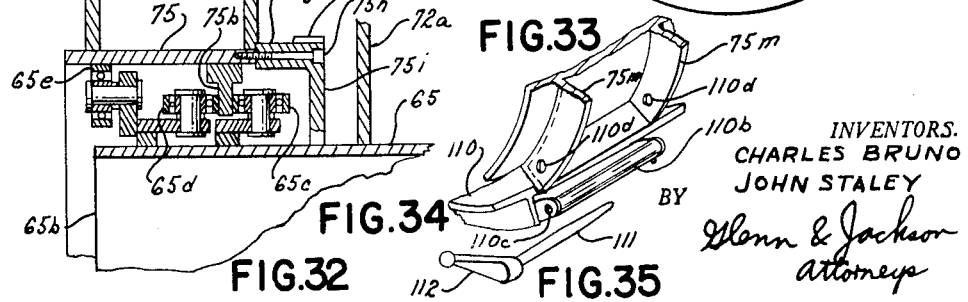
INVENTORS.
CHARLES BRUNO
JOHN STALEY
BY Glenn & Jackson
attorneys

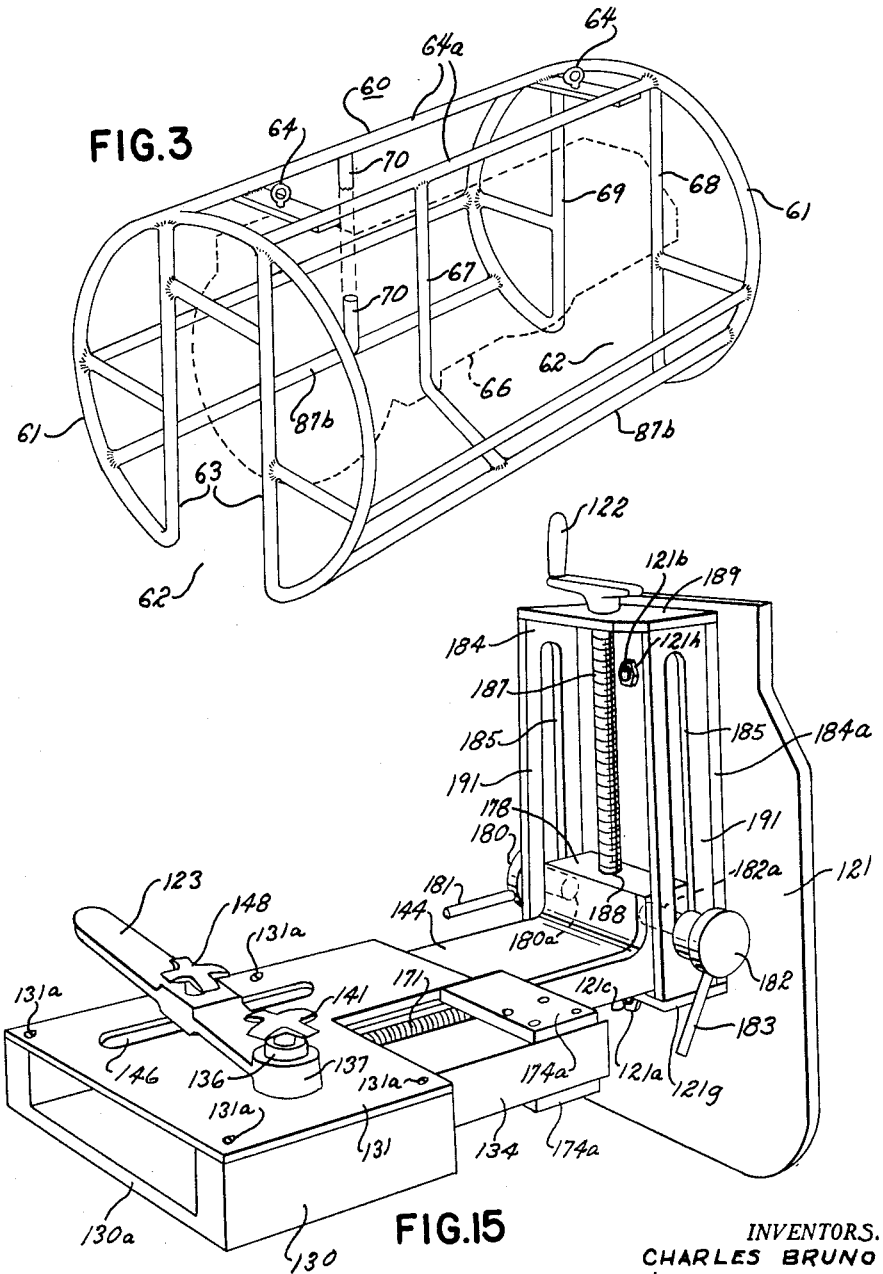

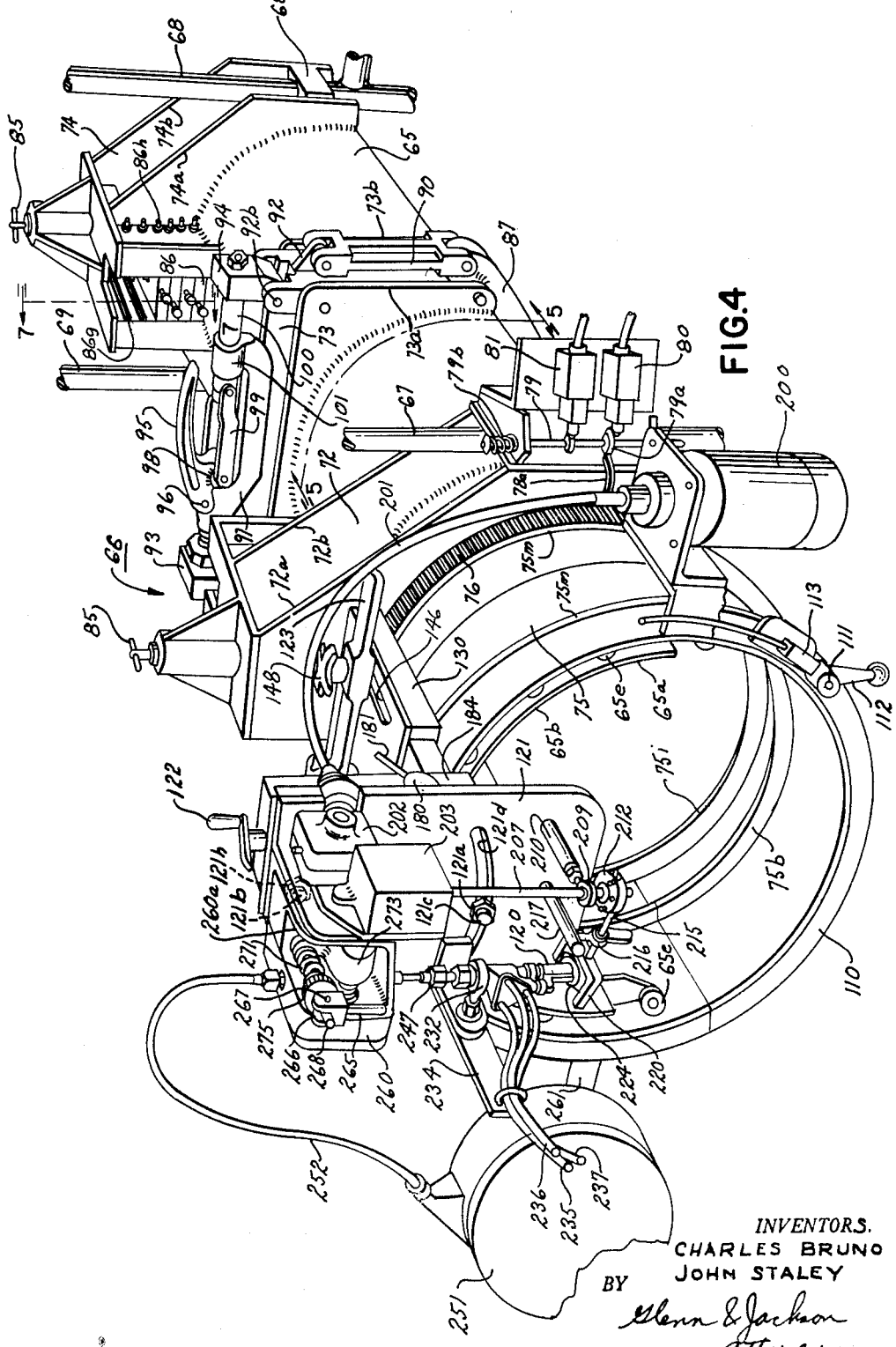

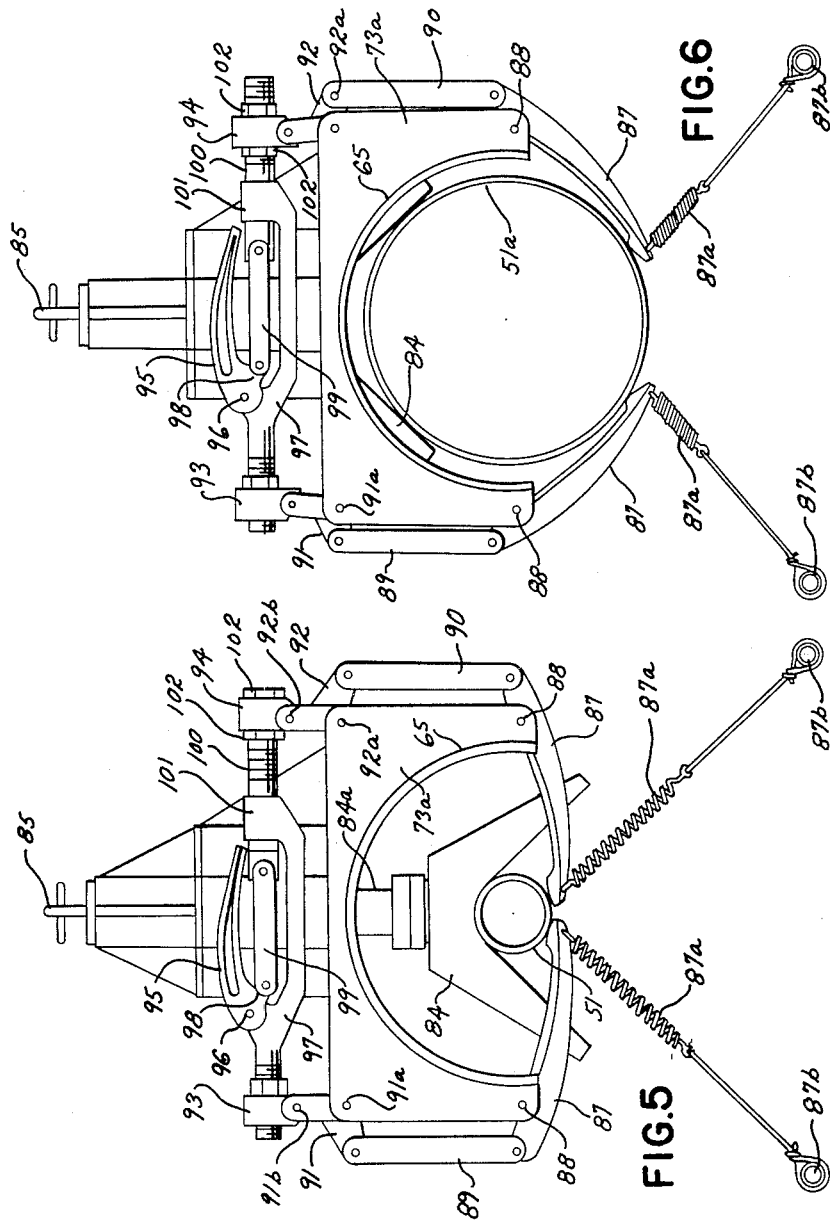

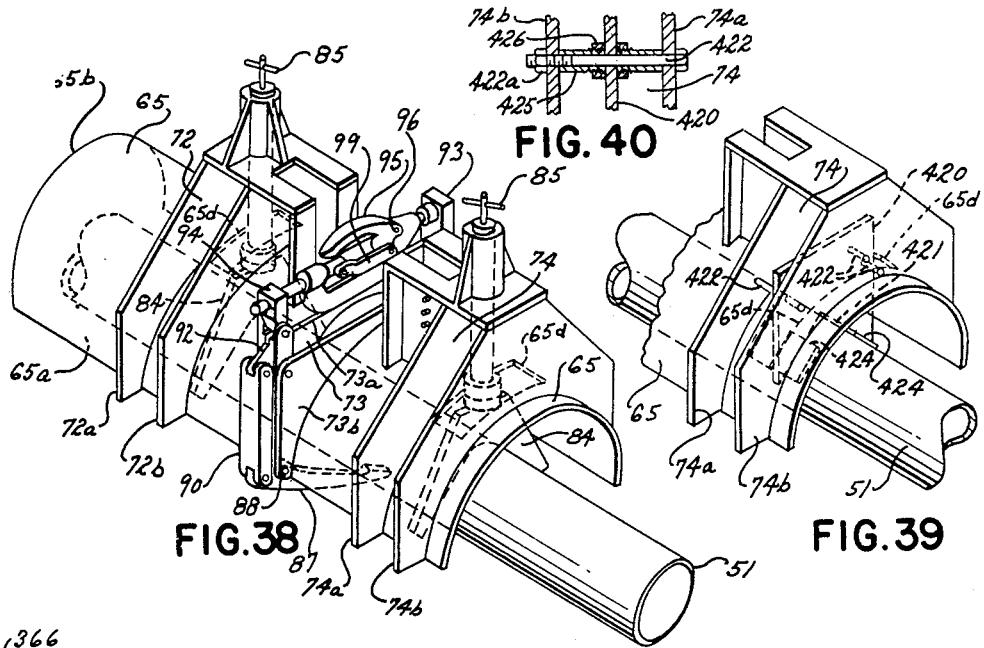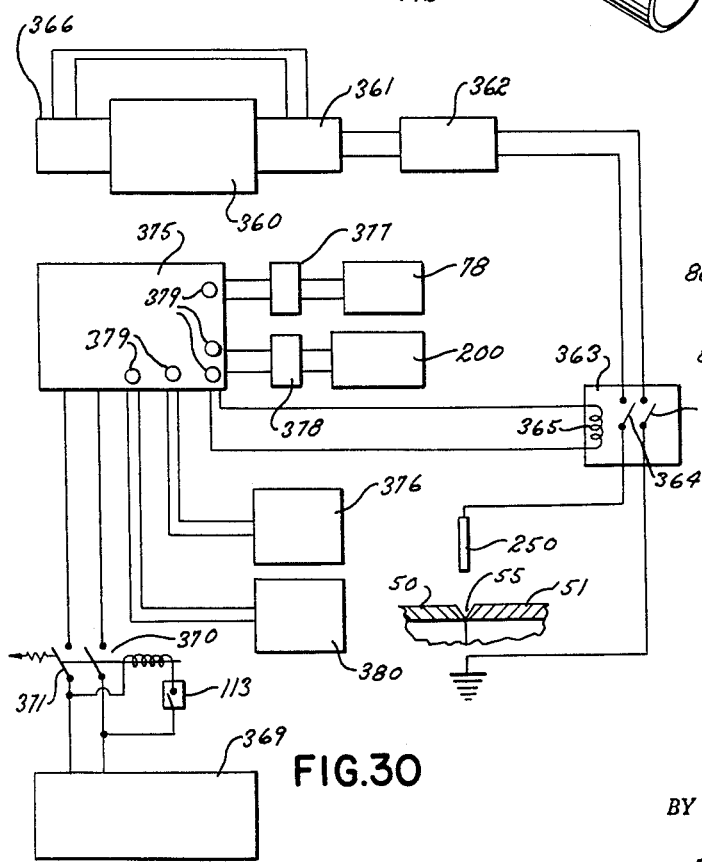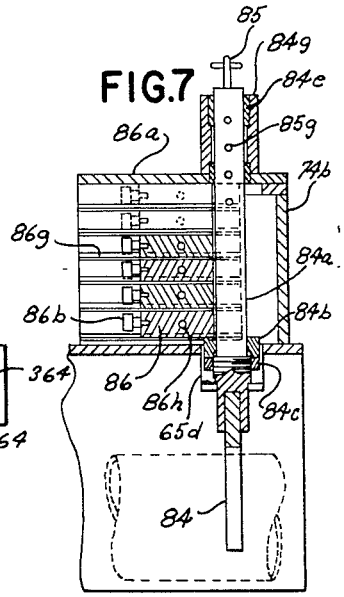

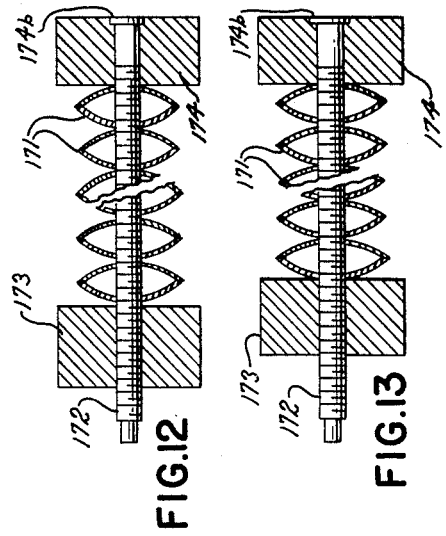
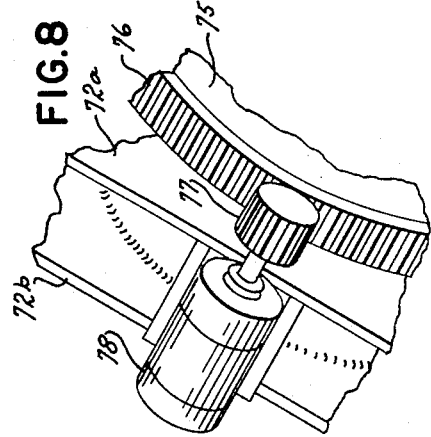
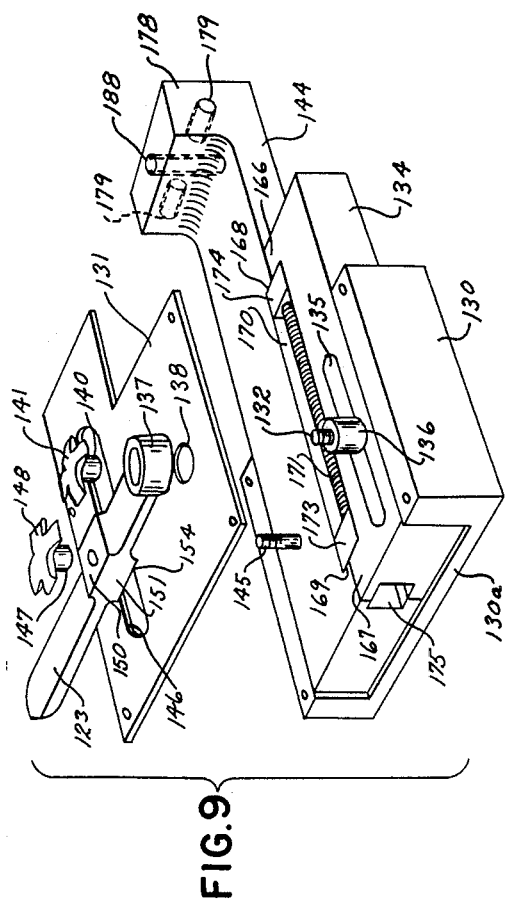
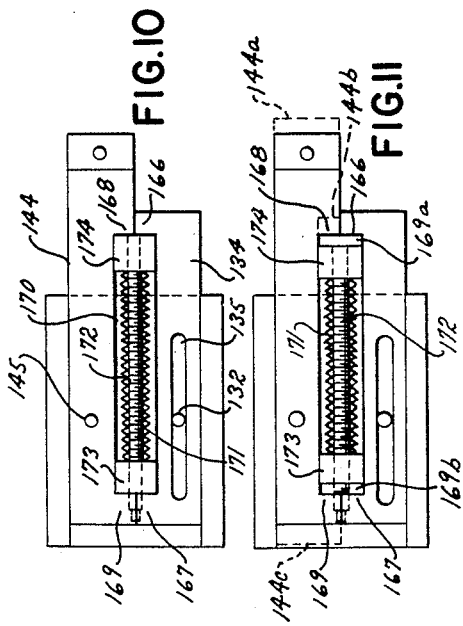

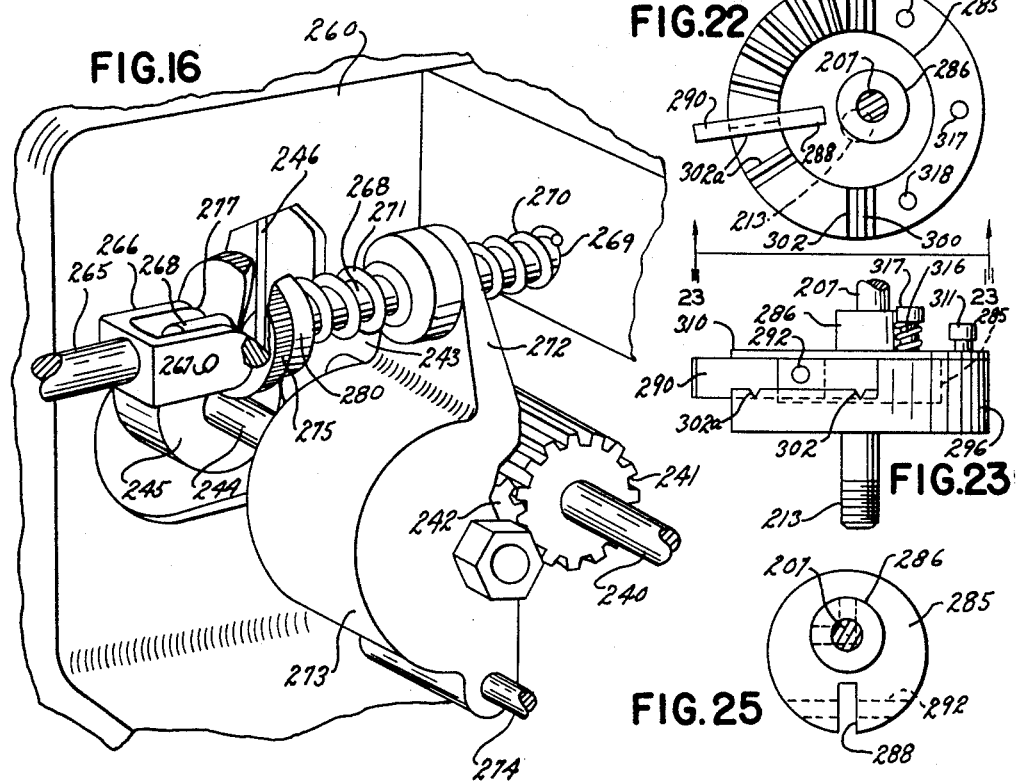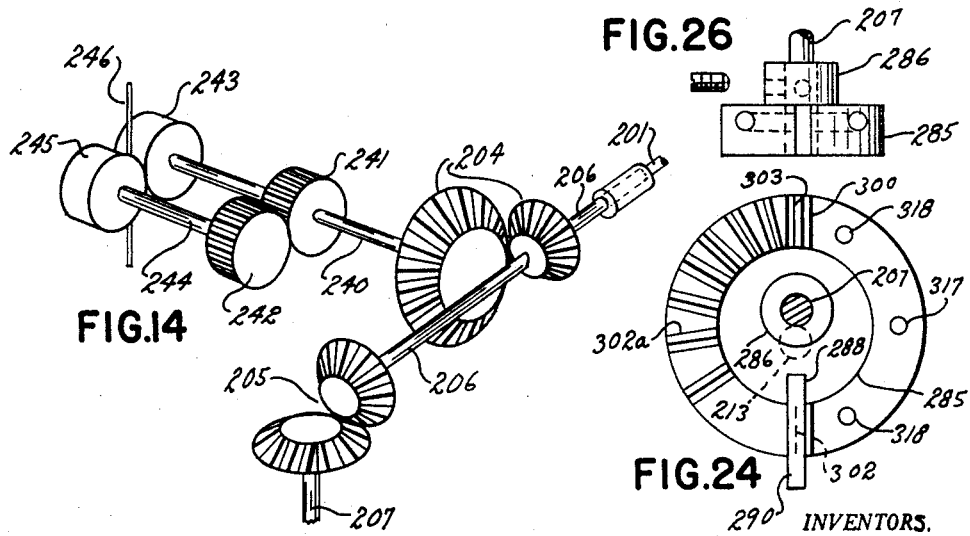

Nov. 15, 1960    C. BRUNO ET AL    2,960,597
WELDING OF CIRCULAR JOINTS AND THE LIKE
Filed June 25, 1958    8 Sheets-Sheet 8
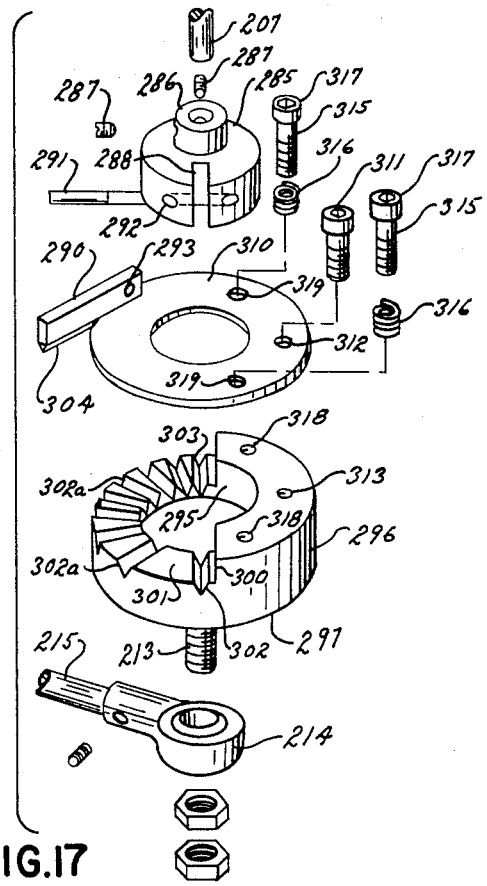
FIG.17
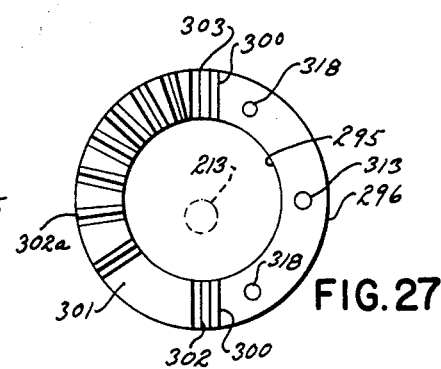
FIG.27
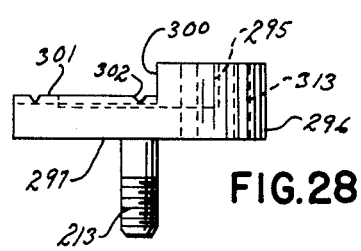
FIG.28
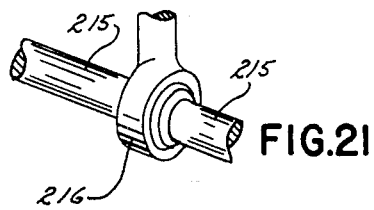
FIG.21
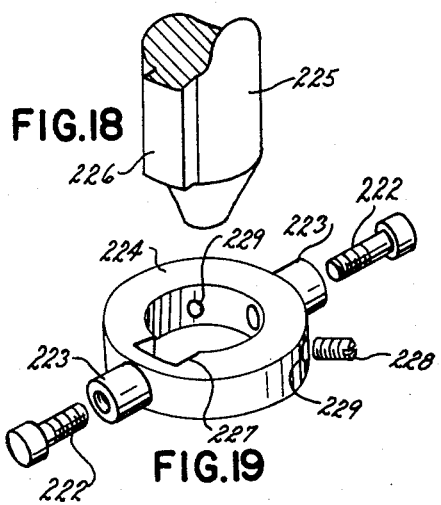
FIG.18
FIG.19
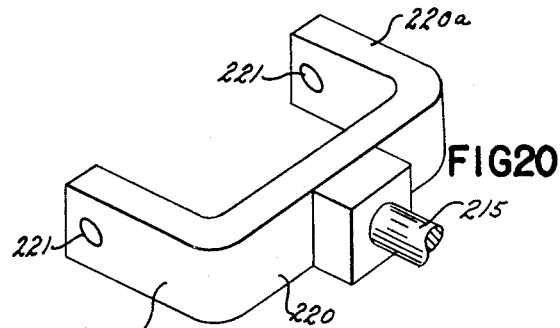
FIG.20
INVENTORS.
CHARLES BRUNO
JOHN STALEY
BY
Glenn & Jackson
attorneys

United States Patent Office 2,960,597
Patented Nov. 15, 1960

2,960,597

WELDING OF CIRCULAR JOINTS AND THE LIKE

Charles Bruno and John Staley, Louisville, Ky., assignors to Reynolds Metals Company, Richmond, Va., a corporation of Delaware Filed June 25, 1958, Ser. No. 744,541

13 Claims. (Cl. 219—125)

This invention is directed to the welding of circular joints, such as the transverse joints in a metal pipeline which is laid in lengthwise sections with transverse circular joints between them. It is readily adaptable for welding the transverse joints in an aluminum pipeline or joints between other aligned cylindrical members. It is also adaptable for welding such joints between cylindrical members made of other metals, such as steel, etc.

When the apparatus is designed for use on a pipeline to be laid in a ditch or the like, an open framework cage is provided to protect the machine and operator. This cage surrounds the main body of the welding machine which includes a longitudinal rigid support member, in the nature of an open bottom inverted channel or arch which is adapted to be lowered over a pipe section to straddle the same. The cage and rigid support member are adapted to be lifted by a crane or the like serially from joint to joint as the pipeline is welded along the ditch.

The rigid support member or inverted channel is adapted to be placed adjacent the last welded section of the pipeline. It is provided with centering or gripping means to grip said section near the joint to be welded. The rigid supporting member rotatably supports an electrode carrying cylinder or rotatable member adjacent the joint to be welded. This cylinder carries a welding electrode head directed toward the joint and rotates and guides the welding head around the joint.

The pipeline section adjacent the joint to be welded, and the section next to be welded, preferably are supported by jigs or the like above the bottom of the ditch, so the joint is free and clear above the ground and is in a position to be welded.

The cage and welding device are adapted to be supported on the elevated and last welded section of the pipe line. The next section of pipe to be welded is supported in elevated and aligned position by jigs or other supports above the bottom with the ends of the pipe sections abutting to form a circular joint, which preferably is V-shaped in cross section. The joint may be preliminarily tack welded, with or without a cylindrical backing member inside of the pipeline at the joint to hold the abutting members in aligned relationship. The machine is then placed adjacent the joint above described.

The joint is maintained stationary and in elevated position while the electrode travels completely around the joint as the electrode is rotated and guided by the electrode carrying cylinder.

The rotatable cylinder preferably is provided with an electrode head carrier which is longitudinally adjustable to adjust the electrode head longitudinally after the machine has been preliminarily gripped or positioned adjacent the joint. The electrode also is adjustable radially of the axis of the joint. It also can be tilted in slanting relation to the radii of the joint. The electrode also may be adjusted equal distances from the initial bead forming position so additional beads may be made equally distant on each edge of the initial bead.

It is among the objects of this invention to provide an apparatus and method for welding circular pipe joints, and embodying one or more of the above features.

Another object of this invention is to provide the electrode head with means for feeding a metal electrode wire, made of aluminum for example, the speed of the feeding operation being adjustable.

Another object of this invention is to provide means for oscillating the electrode while the electrode travels around the joint, such means, if desired, having means for adjusting the amplitude or radius and/or speed of oscillation.

Another object of this invention is to provide means to reverse the rotation of the welding head after it has rotated a selected angular distance, for example, being automatically reversed after rotation of 360°, or, selectively, after 180°, or after any other angular distance of travel.

Further objects of this invention will become apparent as the description proceeds with reference to the accompanying drawings in which:

Figure 1 is a diagrammatic longitudinal cross section of a ditch in which the pipeline is being laid and welded, and showing the welding apparatus in position to weld a joint in the pipeline.

Figure 2 is a cross section taken along the line 2—2 of Figure 1.

Figure 3 is a perspective view of the openwork frame cage, with the welding machine therein shown in dotted lines.

Figure 4 is a perspective view of the welding unit which is carried by the cage shown in Figure 3.

Figure 5 is a vertical cross section taken substantially along the line 5—5 of Figure 4.

Figure 6 is a view similar to Figure 5, but showing the apparatus applied to a larger pipe.

Figure 7 is a vertical cross section taken along the line 7—7 of Figure 4.

Figure 8 is a view in perspective of a portion of the apparatus shown in Figure 4 taken on the opposite side of the view shown in Figure 4, and showing the motor for rotating the electrode head around the joint.

Figure 9 is an exploded perspective view of the means for longitudinally adjusting the electrode head with respect to the main body of the welding apparatus.

Figure 10 is a diagrammatic plan view of a portion of Figure 9.

Figure 11 is a view similar to Figure 10 showing the structure in a different position.

Figure 12 is an enlarged horizontal cross section of a portion of Figure 10.

Figure 13 is a view similar to Figure 12 showing the parts in a different position.

Figure 14 is a diagrammatic perspective view of gearing to drive the wire electrode and the electrode oscillating means.

Figure 15 is a view in perspective taken in the opposite direction from that of Figure 4, and showing means for horizontally and radially adjusting the plate which supports the electrode head.

Figure 16 is an enlarged perspective view of the wire feeding portion of Figure 4 with certain parts broken away.

Figure 17 is an exploded view in perspective of various parts of the electrode oscillating means shown mainly in axial alignment but, for clearness, not always in actual vertical relative position.

Figures 18–21 are views in perspective of certain parts for holding the electrode head.

Figures 22–28 are views of several parts of the variable eccentric for oscillating the electrode head, the views showing the parts in various degrees of assembly and in various positions.

Figure 29 is a longitudinal cross section of a portion of the circular joint between adjacent pipe sections, with a plurality of bead welds and with a portion of the electrode head adjacent thereto.

Figure 30 is a simplified wiring diagram showing the electrical controls for the apparatus.

Figure 31 is an end view of the rigid supporting member of the rotatable cylinder supported thereby.

Figure 32 is an enlarged cross section taken along the line 32—32 of Figure 31.

Figures 33–35 show parts of the rotatable cylinder which open the lower side of the cylinder.

Figure 36 is a longitudinal cross section of two pipe sections with a cylindrical back-up member inserted therein.

Figure 37 is an enlarged end view of a back-up member.

Figure 38 is a view in perspective of a portion of the apparatus shown in Figure 4 taken from the opposite end.

Figure 39 is a perspective view showing another embodiment for supporting the apparatus in coaxial relationship with the pipeline.

Figure 40 is a cross sectional detail of a portion of Figure 39.

Referring first mainly to Figures 1–4, a pipe-line made up of longitudinal sections 50, 51, 52, 52a, etc., is being laid and welded in the ditch 53, which has a bottom 54. The pipe line sections 52 and 52a have already been welded together by the apparatus herein described, and are laying on the bottom of the ditch a considerable distance from the welding operations. The apparatus has progressed to the position shown in Figure 1 to weld the joint 55 between the last welded section 51, and the aligned, but unwelded section 50. The jigs 56 are adapted to support the pipeline sections 50, 51, etc., above the bottom 54 of the ditch, and the sections which have been previously welded, such as sections 52 and 52a are relatively distant from the apparatus and may rest on the bottom 54 of the ditch.

An open framework cage 60 and a welding machine or unit, generally indicated by the numeral 66, are attached together and are adapted to be unitarily lifted by a crane or the like from joint to joint and are adapted to be lowered over and to straddle the pipeline, such as the section 51, where the welding machine 66 is positioned and gripped on the section 51 so its rotatable member or cylinder 75, which carries the electrode head 120, is rotated around the joint 55 one or more times in various ways to be described, so the welding head 120 produces one or more beads, such as beads 160–164 shown in Figure 29, securely to weld the joint in a liquid and gas-tight manner.

The frame 60 has circular ends 61 with openings 62 at the bottom, and columns 63 which permit the cage to be lifted by a crane by hook rings 64 which are attached to longitudinal members 64a, extending between the ends 61. The frame 60 carries the welding machine by uprights 67–70 centrally within the frame. The machine 66 can be rendered completely open along its bottom in a manner to be described, so the cage and machine can be lifted and lowered serially at each joint to perform the welding operations at the joints. Other bars of the frame 60 are clearly shown in Figure 3 and hence are not now further described.

The frame 60 aids in lifting the welding machine 66 and also protects the welding machine from timbers, large tools, etc., which are moved about in such construction work. It also protects the operator and other workmen from accidentally being injured by the machine. Ready access to the machine for operating the same is provided by the open character of the frame.

A longitudinal rigid support member, inverted channel, or arch 65 (see Figure 38) in machine 66 has an open bottom 65a which is adapted to be lowered over one of the sections, 51 for example, to straddle said section 51. The member 65 has centering support and gripping compartments 72, 73 and 74, which support and center the machine 66 with its rotatable member 75 coaxial with the pipe section 51 and with the electrode head 120 substantially in the plane of the joint 55 to be welded.

The rigid support member 65 extends substantially the entire length of the machine. The transverse walls 72a, 72b, 73a, 73b, 74a and 74b are shaped at the bottoms to rest and be welded on top of the support member 65 to form the support and gripping compartments 72, 73 and 74. The compartments 72 and 74 have means for supporting the machine on the pipe section 51, while the compartment 73 has means for gripping the section 51 from underneath, thereby securely holding the machine in selected position on the section 51 (or any other pipe section).

The compartments 72 and 74, Figures 4, 5, 6, 7 and 38, have forks 84 which are adjustably held by compartments 72 and 74 in a manner to support the machine 66 and its rotatable electrode carrying member 75 coaxial with pipes of various standard diameters, such as pipe section 51, Figure 5, or larger diameter pipe section 51a, Figure 6. The fork 84 is carried by the vertical slidable shaft 84a having rings 84b and 84c, Figure 7, adjustably fixed on shaft 84a. For example, ring 84c may be threadedly mounted on the shaft 84a and ring 84b rests on the ring 84c and is adjusted thereby. A plurality of U-shaped blocks 86 are slidably held by side rails 86g in the box 86a mounted at the upper part of compartments 72 and 74. These blocks are slidable leftward in Figure 7 by manipulation of handles 86b out of contact with rings 84b and 84c. Movement of one or more of the bottom blocks 86 away from contact with the ring 84b allows the shaft 84a and fork 84 to rise higher and accommodate a larger diameter pipe, and vice versa. The fork 84 and shaft 84a pass through opening 65d in arch member 65. The handle 85 is used for holding the shaft 84a while adjusting the same. Bearings 84e are provided at the upper end of shaft 84. A plurality of holes 85g in shaft 84a receive a bolt which rests on the top end 84g to hold the shaft 84a at the selected higher position when one or more of the blocks 86 are pulled leftward, Figure 7. Removable bolts 86h hold the blocks 86 in their rightward and leftward positions.

The compartment walls 72a, 72b, and 74a, 74b, Figure 4, have welded thereto the support blocks 68a within the respective compartments 72 and 74 by which the machine 66 is connected to the cage 60, as the columns 67–70 pass through and are secured to such blocks 68a. See Figures 3 and 4.

The compartment 73 contains the mechanism for gripping the lower part of the pipe section 51, or other section. This mechanism hinges between the side members 73a and 73b, Figures 4, 5, 6 and 38. It has upwardly directed pipe gripping levers 87 fulcrumed at 88 and actuated by the vertical links 89 and 90 respectively. The upper ends of these links are actuated by the bell cranks 91 and 92, which are fulcrumed at 91a and 92a respectively, and the upper arms of which are hinged at 91b and 92b respectively to the blocks 93 and 94, which are connected to any suitable type of contracting and expanding mechanism operated by the handle 95. For example, the bell crank handle 95 may be fulcrumed at 96, the fulcrum being connected to the member 97 while the bell crank arm 98 is connected to the link 99, which in turn is connected to the sliding member 100, which slides in the sleeve 101 of the member 97. The block 94 is longitudinally adjustable on the member 100 by turning the nuts 102 on the threads of member 100, so the levers 87 may be adjusted to accept different diameters of pipes 51 or 51a, etc. The levers 87 tightly grip the pipe when the handle 95 is in the position shown in Figures 4–6, and release the pipe when the handle 95 is turned counter-clockwise past dead-center. The levers 87 are pulled to open position by the tension springs 87a, the lower ends of such springs being secured to the longitudinal bars 87b of cage 60, Figures 3, 5 and 6. When the lever 95 is moved counter-clockwise to substantially a horizontal position adjacent block 93, the arm 98 passes dead center and then pulls the link 99 leftward to move sliding member 100 also leftward together with corresponding movement of bell cranks 91 and 92, links 89 and 90, and downward movement of gripping levers 87. This permits the welding machine to be lifted upward and to be moved to the next joint (after rotatable member 75 has been also opened, as described elsewhere).

The rotatable member or cylinder 75 is rotatably supported adjacent the cantilever end 65b of the support member 65, Figures 4, 31–35, and 38. Two horizontal rollers 65c and 65d, Figure 32, are supported on member 65 respectively on both sides of flange 75, which is secured to the interior of member 75. Rollers 65c and 65d hold member 75 against longitudinal movement relatively to the support member or arch 65. A vertical roller 65e is supported on member 65 and supports the rotatable member 75 against downward movement of member 65 relatively to support 65. There are a series of rollers 65e, as indicated in Figure 31 to hold rotatable member 75 against downward and sidewise movement. If desired, a plurality of rollers 65c and 65d may also be provided around the outside of member 65. This construction permits rotation of member 75 about a fixed axis coaxial with the axis of pipe sections 50 and 51, etc. The member 75 is also locked against longitudinal movement relatively to joint 55, or other joint to be welded.

A circular extension 75g, Figure 32, is secured to member 75 by bolts 75h. It has flange 75i, and external gear 76 which is driven by the variable speed and reversible motor 78 through drive gear 77, Figure 8. The motor 78 rotates member 75 through any desired angular distance, such as 360°, and is stopped by the detent 78a Figure 4, when it strikes the control rod 79, at flange 79a, to move it downwardly against spring 79b, to actuate one or more switches 80, 81, etc., to stop and/or reverse the rotation of motor 78 and member 75. If it is desired to have the electrode inactive during its downward travel from its top position 0° to its lowest position 180° and then be energized at the end of 180°, to weld one-half of joint 55, and later the other half, with the welding being performed during the upward 180°–360° travel of the electrode only, for example, then another set of rod and switches, similar to rod 79 and switches 80 and 81, may be placed on the side of the machine which is opposite to that shown in Figure 4 to energize the electrode, etc., at 180°. The rotation of the welding head downward may be faster than the rotation upward when this 180° system is used. The welding of the other half of the joint (180°–0°) is performed in the reverse direction of rotation.

The rotatable member 75 has a removable arc portion 110 of its cylindrical side wall, Figures 4 and 31–35, which is secured to such side wall during rotation of the member 75 and is placed in open position when the welding machine is lowered over, or removed from, a joint in the pipeline. For example, the left end of member 110, Figure 31, is hinged by pin 110a to the remainder of cylinder 75. The right end has a tube 110b having a hole 110c, Figure 34, which dovetails with holes 110d in the flanges 75m secured to the outside of rotatable member 75. A pin 111, Figure 35, is insertable into and removable from the holes 110c and 110d to lock or release the member 110 with respect to the remainder of member 75. The pin 111 has threaded engagement, not shown, with any desired portion of holes 110c and/or 110d, and may be turned by handle 112. Any other type of locking engagement may be provided for pin 111 in lieu of the threaded engagement, such as a wedging bayonet joint, or the like.

A switch 113, Figure 4, is carried by the member 75 adjacent the handle 112 which remains open except when the pin 111 is properly engaging and locking the member 110 in closed position. The switch 113 is a master switch to prevent welding operation of the welding machine until the member 110 is properly in place and locked by handle 112, at which time the switch 113 is closed and closes the control circuit and permits operations of the welding controls.

When it is desired to lower or raise the welding machine to or from a pipe joint, the member 110 is released at its right end in Figure 31, as shown in Figures 33–35, and the member 110 swings down about pin 110a, the member 75 having first been moved so member 110 is at the bottom. At the same time the gripping levers 87, Figures 5 and 6, are placed in their lowermost positions by proper movement of lever 95. The bottom of the machine is thus rendered open so it can be lifted from or lowered over the desired pipe section.

A welding electrode gun 120, Figure 4, is rotated and guided around the pipe joint 55, Figure 1, by the rotation of rotatable member 75. The gun 120 is supported on member 75 (Figs. 4, 9–13 and 15) so the electrode carried thereby may be adjusted or calibrated longitudinally and radially with respect to the pipe joint after the machine has been supported and gripped on the pipe section 51 or 51a previously described. The electrode may also be moved or adjusted in a slanting direction with respect to the radii of the joint. It is thus possible to place and grip the machine approximately in position on the pipeline and then the electrode head may be calibrated longitudinally with the electrode correctly over the joint to be welded. Also, several weld beads as shown in Figure 29 may be formed around the joint at (equally spaced, if desired) longitudinal distances from the center of the joint. The electrode may be adjusted radially of the joint to compensate for various diameters of pipe, for various diameters of the several weld beads in the same joint, etc. The electrode may be adjusted in a slanting direction with respect to the radii of the joint so the electrode can be correctly pointed for the requirements of a rising or lowering welding operation around the joint.

The adjustable supports of the electrode gun on member 75 are shown more particularly in Figures 4, 9–13 and 15. The gun carrying plate 121, Figures 4 and 15, is radially adjustable with respect to the axis of the pipe 51 or joint 55 by turning handle 122, and manipulating other members to be described. The electrode gun and plate 121 are longitudinally adjustable with respect to the axis of the joint by swinging lever 123 horizontally, together with other manipulations to be described. The slanting adjustment of the electrode with respect to the radii of the joint is accomplished by loosening nuts 121a and 121h, Figures 4 and 15, and swinging plate 121 about bolt hinge 121b. The nuts 121a and 121h are attached to bolts 121c and 121b respectively and the arc-shaped slot 121d in plate 121 permits the plate 121 to swing and alter the slant of the electrode gun. The bolt 121c passes through and is attached to an extension of box 191 below plate 121g, Figure 15. The bolt 121b passes through circular holes in back plate 184a of box 184 and in plate 121.

The details of the longitudinal adjustment of the welding gun are shown in Figures 4, 9–13 and 15, and are as follows. The box 130, Figure 15, is secured to the rotatable member 75 by bolts or the like while resting on a flatted part, not shown, of the flanges 75m. The box is in the form of an upwardly directed channel and closed by the cover 131, which can be fixedly secured to the box 130 by screws 131a.

The pin 132, Figure 9, is fixed on the channel bottom 130a. The slidable bar 134 has a slot 135 which fits over the pin 132, so the bar 134 may be longitudinally moved to any desired position as long as the sleeve 136 is not pressed downwardly tightly over the upper surface of the bar 134. The cylindrical fulcrum 137 of the lever 123 fits loosely over the sleeve 136 and above the plate or cover 131, which has an opening 138 loosely to fit around the sleeve 136. The upper end of pin 132 is threaded and is threadedly engaged by the inner cylindrical thread in the sleeve 140 of the handle 141. The handle 141 can be turned to move the sleeve 140 downwardly to engage and push the sleeve 136 (which extends above the fulcrum 137, Figure 15) against hte top of the slidable bar 134 to lock the bar 134 in position. The lever 123 can turn on its fulcrum 137, as the handle 141 and its cylinder 140 do not bear on fulcrum 137.

The bar 144 is also slidable in the channel 130 and has a pin 145, Figure 9, fixed thereto, which passes through the slot 146 in the cover 131 and has an upper threaded end which engages the inner cylindrical thread of the sleeve 147 of the handle 148. When the handle 148 is turned to move the lower end of the cylinder 147 against the top surface 150 of the enlargement 151 bears against the top of the fixed cover 131 and thus locks the lever 123 and bar 144 in the selected position. When the bar 144 is longitudinally locked, the electrode gun 120 is likewise locked against longitudinal movement, since the bar 144 carries the plate 121, etc., Figure 4, to which the electrode head 120 is attached.

The bars 134 and 144 may be locked together (in a manner to be described) for simultaneous movement (with handles 141 and 148 in loose condition) when the electrode gun 120 is to be adjusted and carefully centered over the joint 55. Thereafter, the bar 134 is locked against longitudinal movement by tightening handle 14, and the bar 144 may be adjusted back and forth by the handle 123 (after bars 134 and 144 are unlocked, as later described) to adjust the electrode to produce weld beads on either or both sides of the central bead. The mechanism for accomplishing this is located mainly between the bars 134 and 144 and is as follows.

The slide bar 134 has shoulders 166 and 167 at its ends, Figures 9-13, and the slide bar 144 has cooperating shoulders 168 and 169. These form the limits of the groove 170 in which the spring discs 171 are placed and which surround the screw 172 which has a threaded engagement in the block 173 at one end and a shoulder engagement 174b with the block 174 at the other end. A wrench may be inserted through the opening 175, between the slide bars 134 and 144 to turn the screw 172 and vary the distance between the blocks 173 and 174 as indicated in Figures 10-13. This is for the purpose of limiting or equalizing the distance of longitudinal adjustment of the electrode which may be made on either side from the initial or central bead setting to form beads 162 and 163, Figure 29, of equal displacement from the central beads 160 and 161. Block 174 is maintained in slot 170 by covers 174a, Figures 15, bolted to bar 134. Block 173 is maintained in slot 170 by cover 131 and channel bottom 130a.

Figures 9, 10 and 12 show the bars 134 and 144 locked together by the blocks 173 and 174, which are spaced a distance equal to the distance from the shoulders 166 and 168 to the shoulders 167 and 169 respectively. Hence, the blocks 173 and 174 lock these shoulders and their bars 134 and 144 for movement together when the electrode gun 120 is to be carefully centered over the joint 55 by manually sliding the plate 121 and bars 134 and 144 together until accurate centering is accomplished.

Figures 11 and 13 show how the distance between the blocks 173 and 174 is reduced, by screw 172, a distance equal to the desired longitudinal displacement of the electrode from its central position. This distance is equal to the combined spaces 169a and 169b in Figure 11, since the bar 144 may be moved to the dotted line position 144a and 144b on one side, and to a corresponding position 144c on the other side. Thus, the adjustment of screw 172 and blocks 173 and 174 determines the limit of longitudinal adjustment of the welding head 120 which can be made to either side of the initial bead, and also equalizes such adjustment on either side of the central bead.

When the welding machine is to be placed over a new joint 55, and after the rotatable member 75 and gripping levers 87 have been opened to allow the machine to be lowered over the section 51, the blocks 173 and 174 are spread apart to the position of Figures 9, 10 and 12 to lock the bars 134 and 144 together. The bar 134 is placed so pin 132 is substantially in the center of the slot 135. The bar 144 is automatically positioned by blocks 173 and 174 so pin 145 moves lever 123 substantially perpendicular to the bars 134 and 144. The handles 141 and 148 are then tightened to lock lever 123 and bars 134 and 144 in such position. The welding machine is then lowered and positioned on section 51 with the electrode gun 120 centered roughly over the joint 55, and then the machine is gripped to section 51 in coaxial relationship. The electrode head is generally slightly off center of joint 55, so handles 141 and 148 are loosened so the plate 121 and bars 134 and 144 may be moved manually back and forth until the electrode is accurately centered over the joint 55. The handles 141 and 148 are then tightened and the central bead or beads 160 and 161, Figure 29, are welded. The blocks 173 and 174 are then adjusted toward each other by screw 172 while lever 123 with handle 147 in loose condition, is swung about fulcrum 136–137 so the electrode is centered over the bead 162 (Figure 29) which is to be welded. The lever 123 is then tightened in place by handle 148 and bead 162 is welded. The electrode may then be adjusted past the center of joint 55 to be welded, an off center distance equal to that of bead 162, by loosening handle 148, swinging lever 123 to its other limit, and then tightening handle 148. Bead 163 may then be welded. The electrode may then be recentered over the joint 55 for the welding of bead 164 by manipulating handle 148 and lever 123.

The radial adjustment of the welding head 120 is shown in Figures 4, 9 and 15. The horizontally adjustable bar 144 has an upwardly directed flange or elbow 178 which has two threaded holes 179 (Figure 9) into which the screws 180a and 182a enter (Figure 15). The screw 180a shown in dotted lines in Figure 15 has the head 180 provided with the turning lever 181. The screw 182a has the head 182, which has a turning lever 183. A vertical box-like member 184, Figure 15, is attached to the welding gun carrying plate 121 and has slots 185 through which the screws 180a and 182a pass. The vertical rotatable threaded pin 187 has a rotatable threaded engagement with the hole 188 in the elbow 178. The upper end of the threaded rod 187 rotatably engages the top member 189 of the box-like member 184, in axially fixed relationship, and is provided with the turning handle 122. The threaded rod also rotatably engages the lower plate 121g of box 184 in axially fixed relationship. When it is desired radially to adjust the welding head 120, the handles 181 and 183 are manipulated to loosen the engagement of the heads 180 and 182 with the side members 191 of the box 184. The handle 122 is then turned, causing the rod 187, with its threaded engagement with the hole 188, to move the box 184 and plate 121 radially toward or away from the axis of rotation of member 75 to adjust the welding head 120 radially with respect to the axis of pipe joint 55 which is being welded.

Thus by manipulating the handles 181, 183 and 122, the radial adjustment of the welding gun 120 and the carrying plate 121 is accomplished, after which the adjustment may be locked by turning the handles 181 and 183 to locking or tightening position.

The slanting adjustment of the electrode head relatively to the radii of the joint 55 is accomplished by loosening the nuts 121a and 121h, Figures 4 and 15, and swinging plate 121 about fulcrum pin 121b relatively to vertical box 184, and thereafter tightening nuts 121a and 121h.

Means are provided adjustably to oscillate the electrode 250 (Figure 29) in electrode head 225 to agitate the weld puddle, to promote the elimination of gas bubbles, and to prevent burning of the joint, while the electrode is being rotated around the joint 55, such means being shown in Figures 4, 14 and 17-26. The adjustable or variable speed motor 200, Figure 4, drives such electrode oscillating means through the flexible cable 201 which is connected to the gear boxes 202 and 203 which contain respectively the bevel gears 204 and 205, diagrammatically indicated in Figure 14. The shaft 206 is rotated by the cable 201 to rotate the electrode wire feed bevel gear 204 and the electrode oscillating gear 205.

The gear 205 for oscillating the electrode head rotates the shaft 207 which passes through the bearing 209 (Figure 4) which is fixedly supported by the rod 210 from the plate 121. The shaft 207 is connected to the adjustable throw eccentric 212, which has its adjustable eccentric shaft 213, Figures 17, 23, etc., connected to the axially fixed, but oscillatably free, bearing 214 which is connected to the rod 215, Figures 4 and 17. The rod 215 passes through the axially fixed, but oscillatable free, bearing 216, Figures 4 and 21, which is fixedly supported from the plate 121 by the rod 217. The rod 215 is connected to the U-shaped member or yoke 220, Figures 4 to 20, which is provided with holes 221 through which the pins 222, Figure 19, pass and which then threadedly engage the radial cylinders 223. The cylinders 223 are attached to the ring 224 and are loosely mounted between the forks 220a of yoke 220. The ring 224 receives the nozzle or head 225 (Figure 18) of the welding gun 120, the channel 226 of the nozzle being received in the notch 227 of the ring 224. The nozzle is secured in the ring 224 by means of screws 228 which are inserted in the threaded openings 229 of the ring 224.

The electrode gun 120 is oscillatably supported by the axially fixed, but oscillatable free, bearing 232, Figure 4, which is fixedly secured to the plate 121 by the bracket 234 which also supports the cables, hose, etc. 235, 236, 237, etc., which are connected to the welding gun 120 in the usual and well known manner to impart the desired polarity to the electrode wire later to be described, to feed inert gas, such as argon or helium, into the nozzle or head 225 to maintain a cover of such inert gas in the welding zone, and to conduct cooling water to and from the electrode head, in the well known manner.

The members which carry the ungrounded welding current, or which are exposed by proximity to such welding current, are properly insulated from the remainder of the apparatus and from the pipeline as is well known in the welding art.

The electrode may have plus or minus polarity imparted thereto, as desired, the positive polarity being now preferred for the electrode. The pipe sections which are to be welded together are grounded, so the other arc terminal at the joint is a grounded or neutral terminal.

Means for carrying and feeding a metal wire electrode (such as an aluminum wire) into the welding gun 120 at adjustable and variable speed are provided. Such means are shown in Figures 4, 14 and 16. The shaft 206 (Figure 14) which is driven from the motor 200, as previously described, drives the shaft 240 through bevel gears 204. The shaft 240 carries a gear 241 which meshes with the gear 242 and also carries the insulated wire feed roller 243, made of hard plastic or rubber. The gear 242 drives the shaft 244 which is drivingly connected to the roller 245 also made of similar insulating material. The rollers 243 and 245 axially drive the electrode wire 246, Figure 14, which is fed through the insulating flexible hose construction 247, Figure 4, into the welding gun 120, and this wire 246 becomes the metal electrode 250, Figure 29, which produces the metal arc for forming the beads 160–164 of Figure 20. The wire 246 is supplied from the reel 251, Figure 4, where it is insulatedly held, and from which it is fed through the insulated conduit 252 to the rollers 243 and 245, Figure 14. The wire 246 is insulated from "ground" at all points.

Means are provided for starting and stopping the feed of the wire 246 while the motor 200 is in operation, when desired. For this purpose, the gears 241 and 242 and the wire feeding rollers 243 and 245 may be separated as indicated in Figures 4, 14 and 16. The gears 241 and 242 and the rollers 243 and 245 are supported by the bracket construction 260 which is carried by the plate 121. The reel 251 is carried by the bracket 261 which is supported by the rotatable member 75. The gears 241, 242 and rollers 243 and 245 are engaged together to feed the wire 246 when the handle 265 is in the horizontal position shown in Figure 16, and are separated to stop feeding of the wire 246 when the handle 265 is in the vertical position shown in Figure 4. The handle 265, Figure 16, has a fork 266 which is fulcrumed on pin 267 carried by the rod 268, which is fixedly secured to the bracket 260 at the point 269. The spiral springs 270 and 271 surround the rod 268 on opposite sides of the extension 272 of the gear and shaft carrying casing 273 which carries the gear 242, shaft 244 and roller 245. The gear casing 273 is hinged on the rod 274 which is supported on the wall 260a, Figure 4, of the bracket 260. A knurled knob 275 surrounds the rod 268 and moves axially on the rod 268 and compresses the springs 270 and 271 when the handle 265 is in the position of Figure 16, as the ends 277 of the fork 266 bear against the knob 275, the other end of which engages the spring 271. This causes engagement of the gears 241 and 242 and feed of the wire 246. The knob 275 may be longitudinally adjusted because of its threaded engagement abutment member 280 at the end of spring 271. When the handle 265 is in the vertical position shown in Figure 4, the knob 275 can move longitudinally leftward enough to separate the gears 241 and 242 and rollers 243 and 245 sufficiently to stop the feed of wire 246. This separating action is produced by spring 270 when handle 265 is vertical.

Details of the adjustable eccentric 212 for adjusting the amplitude of electrode oscillation are shown in Figures 17 and 22-28. Drive shaft 207, Figures 17 and 23-26, is eccentrically secured with respect to the small cylinder 285 by means of the sleeve 286, Figures 17, 25 and 26, which is eccentrically mounted on the cylinder 285, the shaft 207 being secured by means of the screws 287. The cylinder 285 has a radial slot 288 which receives the bar 290 in which it is hingedly secured by means of the pin 291 which passes through the holes 292 and 293.

The cylinder 285 is received in the cylindrical hold 295, Figure 17, inside the cylindrical cup 296. The variable eccentric shaft 213 is secured to the bottom 297 of the cup 296 eccentrically of the center of the hole 295, as shown in Figures 22-24 and 27. Part of the side wall of the cup 296 is cut away at 300, Figure 17, to provide a lower floor 301 which has notches 302, 302a and 303 radially and circumferentially cut into the floor 301. These notches selectively receive the lower V-shaped edge 304, Figure 17, of the bar 290. When the bar 290 is in the notch 302, Figure 24, the construction is at its maximum eccentricity, and when the bar 290 is in notch 303 there is no eccentricity between the shafts 207 and 213 since the shafts 207 and 213 are then coaxial. The intermediate notches 302a provide gradually increasing eccentricity as the bar 290 is moved from notch 303 into any of the intermediate notches 302a, Figures 22 and 23, to the point of maximum eccentricity at the notch 302, Figure 24.

For the purpose of providing a quick adjustment of the eccentric 212, inner cylinder 285 is placed within the opening 295 of the cup 296 and is then secured therein by the liftable plate 310, Figure 23, which fits over the upper surfaces of the cylinder 285 and the cup 296. A pin 311, Figure 17, loosely passes through the hole 312 in plate 310 and is threadedly engaged in the hole 313 in cup 296, Figures 17 and 27, loosely to hold the plate 310 so it can be tilted or lifted upwardly to allow the bar 290 to be moved from notch to notch on the floor 301. The longer pins 315 have their upper portions surrounded by springs 316 just below their heads 317. The pins 315 are threadedly engaged in the holes 318, Figures 17 and 27, in cup 296 and loosely pass the holes 319 in plate 310, Figure 17, with the springs 316 between the top of the plate 310 and below the heads 317. By this construction, the springs 316 hold the plate 210 down against the top of bar 290, Figure 23, to maintain the bar in the selected notch 302, 302a, or 303. When it is desired to vary the eccentricity, the plate 310 can be lifted upwardly because of the yielding action of the springs 316, by lifting the bar 290 which may be swung upwardly about the pin 291 and its lower surface 304 may be moved from notch to notch until the desired eccentricity or concentricity is selected, and then the bar 290 and the plate 310 may be released to move down by pressure of springs 316 to press the bar 290 down and maintain the bar in the selected position. The eccentricity of eccentric construction 212, Figure 4, may thus be quickly adjusted to vary the radius or amplitude of oscillation of the electrode 250.

A satisfactory diameter of oscillation of the welding electrode 250 is from 1/16 to 3/8 inch.

A simplified electrical diagram is shown in Figure 30. An internal combustion engine 360, with the usual automatic speed control to maintain a selected constant speed, drives an A.C. generator 361 which is electrically connected to the rectifier 362 (which may also be driven by the engine 260) for supplying welding current to the electrode 250 and to the joint 55. The welding current is controlled by the controller 363 which has movable contacts 364 opened and closed by the A.C. solenoid 365. The controller 363 is shown in simplified symbols as it is a well known article of commerce. The A.C. generator 361 has its windings energized by the D.C. generator 366 also driven by the engine 360. The internal combustion engine 360, generators 361 and 366 and rectifier 362 also comprise an article of commerce.

Another internal combustion engine and A.C. generator unit 369, having automatic speed and voltage controls, supplies A.C. at 115 volts for operating the various controls of the system. The master switch 113 is open except when the rod 111 (Figure 4) is in proper position, to guard against welding energization when the rotatable member 75 is not properly closed. The switch 113 energizes the relay 370 to close the contacts 371 when switch 113 is closed. The contacts 371 are biased to open position and open whenever switch 113 is open. Hence, all of the controls in the circuit of unit 369 are deenergized except when rod 111 is in proper position and no welding operation can be made when the portion 110 (Figure 4) of rotatable member 75 is not properly closed.

A controller 375 receives current from unit 369 and feeds current in proper sequence to the rotation motor 78, wire feed and oscillation motor 200, gas feed valve 376 for feeding inert gas to the nozzle 225 around the electrode, and water feed valve 380 for cooling water. An automatic stop, reversing control and speed control 377 is provided for motor 78 and a similar control 378 is provided for motor 200. Various automatic, manual and/or foot controls 379 are provided for performing the following operations or sequences:

(a) Rotate electrode gun 120 about joint 55 at a constant selected speed.

(b) Feed a consumable aluminum or other metal electrode 250 to electrode gun 120 at a constant selected speed.

(c) Supply inert gas to electrode gun 120.

(d) Circulate cooling water through the electrode gun.

(e) Apply welding current to the electrode 250.

(f) Reverse the rotation of electrode gun 120 after a selected distance of angular travel.

This apparatus may be used to weld other metals besides aluminum. For example, steel joints may be welded using a steel or similar wire and $CO_2$ as the inert gas.

Figures 29, 36 and 37 show a cylindrical metal back-up member 400 which may be inserted at the joint 55 to hold the sections 50 and 51 in aligned position. This member 400 may have tack weld tips 401 which are used in tack welding the sections 50 and 51 to each other and to the back-up member 400 prior to the placing of the welding machine on section 51. However, the tips 401 may be omitted, if desired. Alternatively, the ends of sections 50 and 51 may be directly tack-welded to each other without the use of the back-up member 400 before the welding machine is lowered in place.

Figures 39 and 40 show an alternative construction for supporting the machine on the pipe section 51. The compartments 72 and 74, previously described, have a transverse plate 420 with an inverted V bottom 421 which is secured to the walls 74a and 74b (and a similar plate is secured to walls 72a and 72b) by means of the bolts 422 (three for example) which pass through the plate 421 and walls 74a, 74b with a threaded engagement with the nuts 422a. Sleeves 425 hold the plate 420 properly spaced from the walls 74a and 74b. The sleeves 425 have longitudinally threaded collars 426 for tightly holding the plate 420 in place. Alternatively the plates 74a and 74b may be spaced closer together, snugly to receive the plate 420, under which conditions the sleeves 425, 426 may be omitted, and the bolts 422, 422a will be sufficient to hold the plate 420 without danger of longitudinal movement. The plate 420 passes through a slot 65d in the support member 65 and may rest directly on the pipe section 51. Minor adjustment may be provided by placing shims 424 between the V bottom and the section 51. Longer or shorter plates 420 may be substituted to adjust for different sizes of pipes. Alternatively holes of various heights may be made in plate 420 to hold the plate at different levels for different sizes of pipes.

In operating the machine with 180° upward welds on each side of the joint 55, the rotatable member 75 is first rotated with the welding head at the top or 0° position and is rotated 0° to 360° (0° and 360° are the top position of the circular pipe joint to be welded). However, the welding electrode 250 is not energized until the bottom or 180° point of rotation of the welding head is reached. At this 180° point, the electrode is energized and the welding operation is performed only during the upward 180°–360° of rotation to weld one side of the joint 55. Thereafter, the rotation is stopped at 360° and the rotation of member 75 is reversed for 360° to 0° rotation with the same upward welding procedure, so the weld takes place only while the electrode is rising 180°–0° on the other side of the joint 55 to complete the weld. The flow of gas, etc is controlled so it is supplied only substantially during the rising portions of travel of the electrode, but may be supplied also a short interval of time before such time to purge the apparatus and blanket the joint at the start of the welding operation. Water may be fed continuously during the entire 360° of rotation. Oscillation and wire feed may be effective only during the time the electrode is energized.

The rotation during the downward 180° travel of the electrode may be relatively fast and the upward 180° travel is at a welding speed, depending on weld conditions.

The welding energization, the rotation of member 75, the flow of gas and water, etc., may be controlled by simple control units now on the market for performing these controls, each of which control units is provided with its individual knob or knobs for manual control of each step and factor of the welding operation.

The control units, alternatively, may be inter-connected so the electrode may be rotated 0°–360° or vice versa. The welding operation may take place downwardly and upwardly throughout the 0°–360° and 360°–0° rotations.

While the preferred embodiment has been disclosed, as required by the statutes, other forms may be used, all coming within the scope of the claims which follow.

What is claimed is:

1. An apparatus for welding a circular joint between two aligned cylindrical metal sections of a pipeline, or the like, which comprises: a longitudinal rigid support member with an open bottom adapted to be lowered over one of said sections to straddle said section; an electrode carrying cylinder rotatably supported on said rigid support member and having a portion of its side wall constructed to be opened and closed in alignment with said open bottom to permit said cylinder to be lowered with said rigid support member rotatably to surround one of said sections; centering means on said support member to engage said one of said sections and adjustably to support said support member on said one of said sections with said cylinder centered and coaxial with said circular joint; a wire feeding and carrying electrode head carried by said carrying cylinder and directed toward the periphery of said joint; and means to adjust said electrode head longitudinally with respect to said metal sections after said centering means have engaged said one of said sections.

2. An apparatus for welding a circular joint between two aligned cylindrical metal sections of a pipeline, or the like, which comprises: a longitudinal rigid support member with an open bottom adapted to be lowered over one of said sections to straddle said section; an electrode carrying cylinder rotatably supported on said rigid support member and having a portion of its side wall constructed to be opened and closed in alignment with said open bottom to permit said cylinder to be lowered with said rigid support member rotatably to surround one of said sections; centering means on said support member to engage said one of said sections and adjustably to support said support member on said one of said sections with said cylinder centered and coaxial with said circular joint; a wire feeding and carrying electrode head carried by said carrying cylinder and directed toward the periphery of said joint; and adjustable driving means drivingly connected to rotate said cylinder at adjustable speeds.

3. An apparatus for welding a circular joint between two aligned cylindrical metal sections of a pipeline, or the like, which comprises: a longitudinal rigid support member with an open bottom adapted to be lowered over one of said sections to straddle said section; an electrode carrying cylinder rotatably supported on said rigid support member and having a portion of its side wall constructed to be opened and closed in alignment with said open bottom to permit said cylinder to be lowered with said rigid support member rotatably to surround one of said sections; centering means on said support member to engage said one of said sections and adjustably to support said support member on said one of said sections with said cylinder centered and coaxial with said circular joint; a wire feeding and carrying electrode head carried by said carrying cylinder and directed toward the periphery of said joint; and a reversible driving means drivingly connected to rotate said cylinder in opposite directions.

4. An apparatus for welding a circular joint between two aligned cylindrical metal sections of a pipeline, or the like, which comprises: a longitudinal rigid support member with an open bottom adapted to be lowered over one of said sections to straddle said section; an electrode carrying cylinder rotatably supported on said rigid support member and having a portion of its side wall constructed to be opened and closed in alignment with said open bottom to permit said cylinder to be lowered with said rigid support member rotatably to surround one of said sections; centering means on said support member to engage said one of said sections and adjustably to support said support member on said one of said sections with said cylinder centered and coaxial with said circular joint; a wire feeding and carrying electrode head carried by said carrying cylinder and directed toward the periphery of said joint; and driving means for said cylinder to reverse rotation after said cylinder has rotated a selected angular distance.

5. An apparatus for welding a circular joint between two aligned cylindrical metal sections of a pipeline, or the like, which comprises: a longitudinal rigid support member with an open bottom adapted to be lowered over one of said sections to straddle said section; an electrode carrying cylinder rotatably supported on said rigid support member and having a portion of its side wall constructed to be opened and closed in alignment with said open bottom to permit said cylinder to be lowered with said rigid support member rotatably to surround one of said sections; centering means on said support member to engage said one of said sections and adjustably to support said support member on said one of said sections with said cylinder centered and coaxial with said circular joint; a wire feeding and carrying electrode head carried by said carrying cylinder and directed toward the periphery of said joint; means to oscillate said electrode head as it travels around said joint; and means to adjust the amplitude of oscillation of said electrode head.

6. An apparatus for welding a circular joint between two aligned cylindrical metal sections of a pipeline, or the like, which comprises: a longitudinal rigid support member with an open bottom adapted to be lowered over one of said sections to straddle said section; an electrode carrying cylinder rotatably supported on said rigid support member and having a portion of its side wall constructed to be opened and closed in alignment with said open bottom to permit said cylinder to be lowered with said rigid support member rotatably to surround one of said sections; centering means on said support member to engage said one of said sections and adjustably to support said support member on said one of said sections with said cylinder centered and coaxial with said circular joint; a wire feeding and carrying electrode head carried by said carrying cylinder and directed toward the periphery of said joint; means to oscillate said electrode head as it travels around said joint; and means to vary the speed of oscillation of said electrode head independently of the speed of rotation of said electrode carrying cylinder.

7. An apparatus for welding a circular joint between two aligned cylindrical metal sections of a pipeline, or the like, which comprises: a longitudinal rigid support member with an open bottom adapted to be lowered over one of said sections to straddle said section; an electrode carrying cylinder rotatably supported on said rigid support member and having a portion of its side wall constructed to be opened and closed in alignment with said open bottom to permit said cylinder to be lowered with said rigid support member rotatably to surround one of said sections; centering means on said support member to engage said one of said sections and adjustably to support said support member on said one of said sections with said cylinder centered and coaxial with said circular joint; a wire feeding and carrying electrode head carried by said carrying cylinder and directed toward the periphery of said joint; and means for adjusting said centering means for different diameters of metal sections.

8. An apparatus for welding a circular joint between two aligned cylindrical metal sections of a pipeline, or the like, which comprises: a longitudinal rigid support member with an open bottom adapted to be lowered over one of said sections to straddle said section; an electrode carrying cylinder rotatably supported on said rigid support member and having a portion of its side wall constructed to be opened and closed in alignment with said open bottom to permit said cylinder to be lowered with said rigid support member rotatably to surround one of said sections; centering means on said support member to engage said one of said sections and adjustably to support said support member on said one of said sections with said cylinder centered and coaxial with said circular joint; a wire feeding and carrying electrode head carried by said carrying cylinder and directed toward the periphery of said joint; and means automatically to adjust said electrode head longitudinally equal distances on either side from a selected initial position to weld beads equally spaced from an initial central bead.

9. An apparatus for welding a circular joint between two aligned cylindrical metal sections of a pipeline, or the like, which comprises: a longitudinal rigid support member with an open bottom adapted to be lowered over one of said sections to straddle said section; an electrode carrying cylinder rotatably supported on said rigid support member and having a portion of its side wall constructed to be opened and closed in alignment with said open bottom to permit said cylinder to be lowered with said rigid support member rotatably to surround one of said sections; centering means on said support member to engage said one of said sections and adjustably to support said support member on said one of said sections with said cylinder centered and coaxial with said circular joint; a wire feeding and carrying electrode head carried by said carrying cylinder and directed toward the periphery of said joint; and means to rotate said cylinder a selected angular distance without energization of an electrode in said electrode head and another angular distance with energization of said electrode.

10. An apparatus for welding a circular joint between two aligned cylindrical metal sections of a pipeline, or the like, which comprises: a longitudinal rigid support member with an open bottom adapted to be lowered over one of said sections to straddle said section; an electrode carrying cylinder rotatably supported on said rigid support member and having a portion of its side wall constructed to be opened and closed in alignment with said open bottom to permit said cylinder to be lowered with said rigid support member rotatably to surround one of said sections; centering means on said support member to engage said one of said sections and adjustable to support said support member on said one of said sections with said cylinder centered and coaxial with said circular electrode head carried by said carrying cylinder and directed toward the periphery of said joint; and means to rotate said cylinder for 360° without energization of an electrode in said electrode head during an angular fraction of said 360° and with energization of said electrode during the travel of the remaining fraction of said 360°.

11. An apparatus for welding a circular joint between two aligned cylindrical metal sections which comprises: a longitudinal rigid support member adapted to be moved laterally toward one of said sections to cause said rigid support member to be supported by said section; a welding head carrying member rotatably supported on said rigid support member, said member comprising a structure having a portion of its side wall constructed to permit said carrying member to be moved laterally with said rigid support member rotatably to travel around said joint; centering means on said support member and including two members in two different transverse planes adjustably connected to said rigid support member to permit said rigid support member to be radially, obliquely and longitudinally adjusted at both ends with respect to said last named section and to engage said last named section and adjustably to locate said support member with the travel of said carrying member centered coaxially with said circular joint; a welding head carried by said carrying member directed toward the periphery of said joint; and means to adjust said welding head longitudinally with respect to said metal sections after said centering means have engaged said last named section.

12. An apparatus for welding a circular joint between two aligned cylindrical metal sections which comprises: a longitudinal rigid support member adapted to be moved laterally toward one of said sections to cause said rigid support member to be supported by said section; a welding head carrying member rotatably supported on said rigid support member, said members comprising a structure having a portion of its side wall constructed to permit said carrying member to be moved laterally with said rigid support member rotatably to travel around said joint; centering means on said support member and including two members in two different transverse planes adjustably connected to said rigid support member to permit said rigid support member to be radially, obliquely and longitudinally adjusted at both ends with respect to said last named section and to engage said last named section and adjustably to locate said support member with the travel of said carrying member centered coaxially with said circular joint; and a welding head carried by said carrying member directed toward the periphery of said joint.

13. An apparatus for welding a joint between two adjacent metal members which comprises: a welding head; means automatically to cause relative movement between and to guide said welding head along said joint to weld a central bead along a central plane of said joint; means automatically to repeat said relative movement and to guide said welding head in a path equally distant to the path produced by said last named means to weld a first bead at a first spaced distance from said plane on one side of and parallel to said central bead; and means automatically to repeat said relative movement and to guide said welding head in a path equally distant and on the other side of said central plane to weld a second bead parallel to said central plane and at a second spaced distance from said central plane equal to said first spaced distance.

References Cited in the file of this patent
UNITED STATES PATENTS

| | | |
|---|---|---|
| 2,013,630 | Goldsborough | Sept. 3, 1935 |
| 2,721,248 | Kirkpatrick | Oct. 18, 1955 |
| 2,795,689 | McNutt | June 11, 1957 |
| 2,894,111 | McNutt | July 7, 1959 |